Dec. 20, 1932.   L. E. WILLIAMS   1,891,517
TEMPORARY LOAD SUPPORT FOR SEMITRAILERS
Filed March 4, 1931
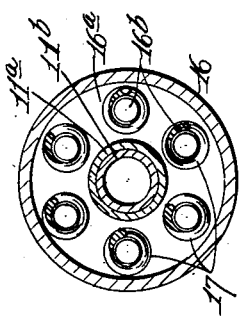
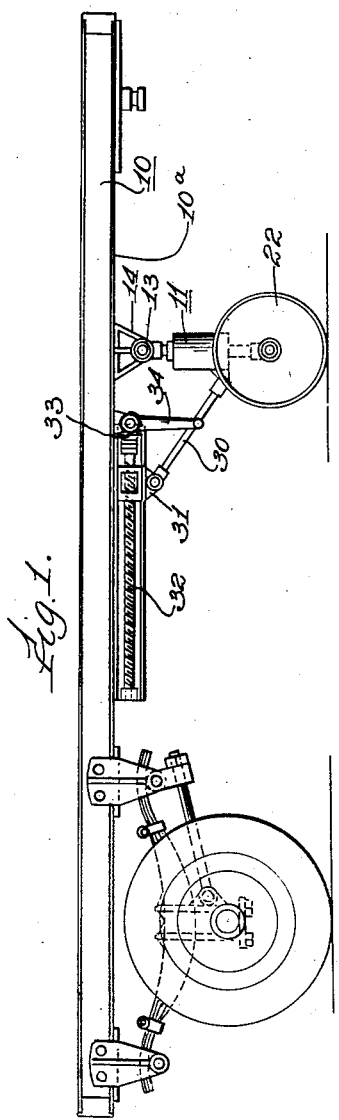
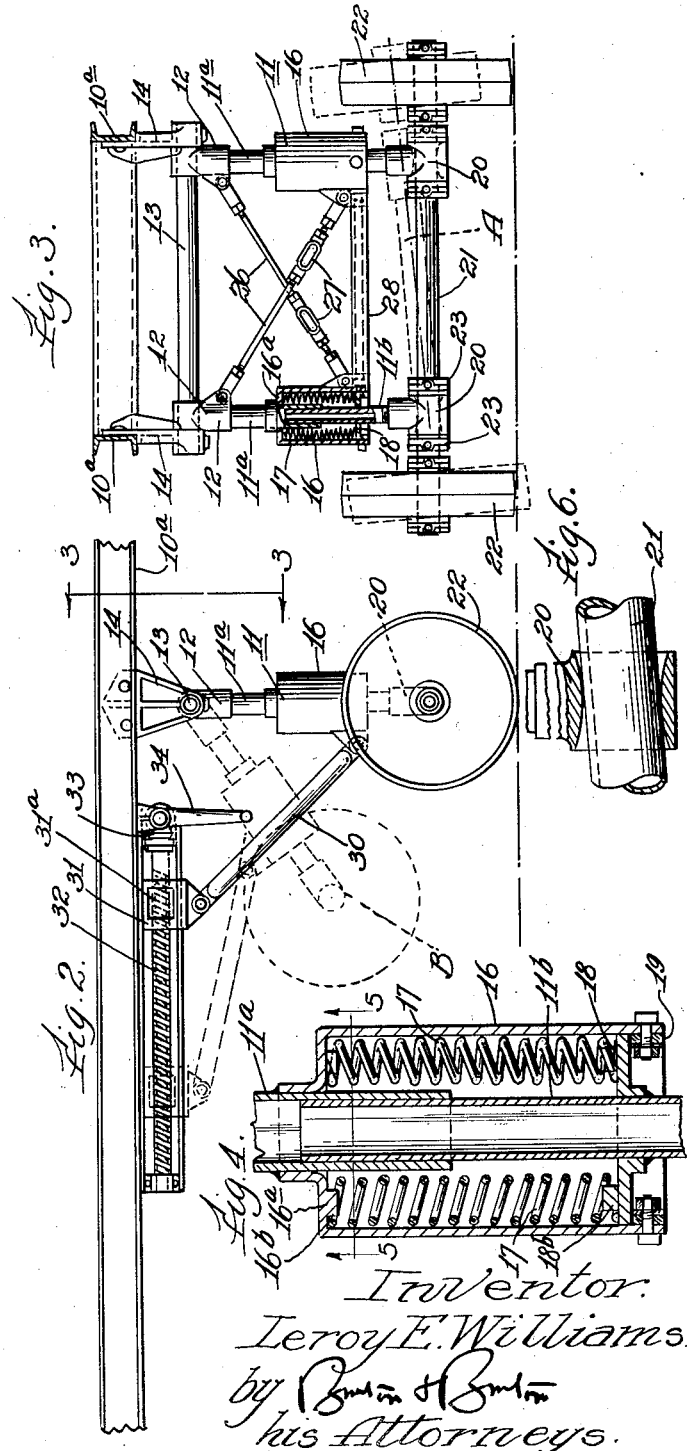
Inventor:
Leroy E. Williams
by Burton & Burton
his Attorneys.

Patented Dec. 20, 1932

1,891,517

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

TEMPORARY LOAD SUPPORT FOR SEMITRAILERS

Application filed March 4, 1931. Serial No. 520,022.

This invention relates to vehicles of the semi-trailer type, and more particularly to a temporary load support adapted for supporting the forward end of the semi-trailer when it is uncoupled from the tractor.

The main object of the present invention is to embody in a temporary load support, means adapted for yieldingly carrying the forward end of the trailer when it is uncoupled from the tractor, and arranged for yieldingly transmitting the load of said forward end of the trailer to the ground-engaging wheels during the uncoupling of the trailer from the tractor, thus acting as a shock absorber if the trailer is dropped a few inches in the uncoupling action. Another object is to provide a temporary load support adapted to compensate for roadbed irregularities when the trailer is detached from the tractor, and also arranged for distributing the load on the forward end of the trailer to both of the supporting legs even when said supporting legs are resting upon an irregular or uneven surface, so as to reduce the tendency to cause distortion and twisting in the trailer frame when the trailer is standing alone on uneven ground. The invention consists in certain elements and features of construction, in combination, as herein shown and described, and as indicated by the claims.

In the drawing:

Figure 1 is a side elevation of a semi-trailer vehicle, equipped with a temporary load support embodying the present invention.

Figure 2 is an enlarged view in side elevation of my improved temporary load support shown in operative position.

Figure 3 is a transverse sectional view through the trailer vehicle looking at the temporary load support, and taken substantially as indicated at the line 3—3 on Figure 2.

Figure 4 is an enlarged vertical section of the yielding means associated with each of the legs of the temporary support.

Figure 5 is a transverse section through the supporting leg taken substantially as indicated at the line 5—5 on Figure 4.

Figure 6 is an enlarged detail section of the pivot bearing at the lower end of the supporting legs.

For the purpose of illustration the present invention is shown in connection with a conventional form of semi-trailer chassis (body being omitted) which includes a main frame, 10, at the forward end of which is carried the temporary load support. The supporting structure of this temporary support as shown in the drawing is composed of two transversely spaced supporting legs, 11, each of which comprises two co-operating tubular members $11^a$ and $11^b$, adapted to be telescoped one within the other. The upper members, $11^a$, of each of the supporting legs are provided with bearing brackets, 12, having journal support on a transversely extending tubular shaft, 13, which is supported at its outer ends in depending brackets, 14, rigidly secured to the longitudinally extending channel members, $10^a$, of the trailer chassis. The co-operating leg members are preferably dimensioned so that normally they telescope a short distance one in the other, but permit a comparatively long range of additional movement for compensating for the movement of the trailer frame with respect to the ground-engaging elements as the latter assume the load, as will hereinafter appear. Rigidly secured adjacent the lower ends of each of the uppermost leg members, $11^a$, is a downwardly open annular housing, 16, which serves to completely encase a plurality of coil compression springs, 17, which are disposed symmetrically about said legs. These springs react against a transverse abutment, $16^a$, on the upper leg member which also happens to be the upper end of said casing, 16, and at their opposite ends against a transverse abutment in the nature of a flange indicated at 18, which is rigidly secured to the lower leg member $11^b$, and dimensioned to fit snugly in the housing, 16. To insure against separation of the leg members, $11^a$ and $11^b$, the transverse flange, 18, is confined within the housing, 16, by a retaining ring, 19, which is rigidly secured to the inner wall of and adjacent the lower end of said casing, 16, as seen in Figure 4. It will thus be apparent that the telescoping of the leg members, $11^a$ and $11^b$, one in the other, is yieldingly permitted by the coil springs, 17, reacting between the fixed stop shoulders, 16ª and 18, on the respective leg members, as may be seen in Figure 5. The coil springs, 17, are herein shown as six in number for each of the supporting legs and for the purpose of maintaining them centrally and in proper position the transverse flanges, 16ª and 18, are preferably formed with protruding bosses, 16ᵇ and 18ᵇ, which engage in the ends of said springs.

The lower ends of the lowermost leg members, 11ᵇ, are each provided with pivot bearings, 20, in which is journaled a transversely extending shaft, 21, whose outer ends carry the ground-engaging elements shown as wheels, 22. The bearings, 20, as indicated in Figure 6 are formed substantially larger at their opposite ends than at the center thereof so as to provide clearance to accommodate a substantial range of angular movement of said shaft, 21, in pivoting about either of said bearings as indicated in dotted lines at A in Figure 3, for permitting said wheels, 20, to accommodate themselves to irregularities and unevenness in the roadbed. This particular formation of the bearing in effect provides a rocking fulcrum for said shaft. To limit the axial movement of the shaft in the bearings, 21, it is fitted with collars, 23, at opposite ends of said bearing.

The supporting legs are preferably reinforced so as to prevent twisting or angular distortion of one with respect to the other, and for this purpose there is provided a pair of obliquely disposed oppositely extending braces, 26, the upper ends of which are connected to the bearing brackets, 12, and the lower ends connected to the housing, 16, of the opposite leg member. To take up any play that may be present or to take up wear and probably slight distortion of the elements after use, each of these brace elements is provided with a turnbuckle, 27, for varying the length of the brace, by means of which the supporting legs may be always held in rigid relation for insuring efficient operation. To further reinforce the supporting legs there is provided a transverse brace, 28, which connects the lower ends of the respective spring housings, 16.

The supporting structure is moved to and from operative position by a conventional form of mechanism, which as shown in Figure 2 includes a pair of controlling links, 30, connected to the respective spring housings, 16; the upper ends of said links converge and are pivotally connected at their upper ends to a carriage, 31, which is arranged for longitudinal movement by means of a nut, 31ª, housed therein and actuated by the rotation of the screw, 32, which is journaled in suitable supporting brackets on the trailer frame. This screw, 32, may be rotated in a conventional manner, as, for example, by the bevel gearing indicated at 33, manually operated by a handle, 34, disposed at the side of the trailer frame. Thus by rotation of the handle the carriage, 31, is longitudinally moved and the supporting structure may be shifted to and from operative position, and the relative position of the supporting leg elements is in inoperative position as indicated in dotted lines at "B" in Figure 2.

This improved temporary load-support thus provides means for yieldingly supporting the forward end of the trailer when it is uncoupled from the tractor, and this feature of construction is believed to be of great importance in the actual uncoupling operation wherein the trailer normally is caused to drop some distance and thus receives at least a slight jolt as the tractor is drawn away. At such times my improved spring means will act as a shock absorber and prevent imparting the severe jar and strain to the trailer frame structure which ordinarily is incident to the uncoupling operation. Moreover the construction is such as to accommodate itself to roaded irregularities when the trailer is uncoupled from the tractor and because of the novel yielding support and pivoting action of the ground-engaging wheels with respect to the lower ends of the supporting legs, each of the supporting legs will be caused to assume a portion of the load at the forward end of the trailer, even when it is resting on uneven surface. Manifestly such a construction prevents imparting undue strain to the trailer frame, causing distortion and twisting of its members and weakening of the entire frame structure as frequently results with the commonly employed rigid temporary supporting structures. By virtue of this construction it is practically impossible for one of the supporting legs at the forward end of the trailer to assume the entire load.

Although I have shown and described one form in which my invention may be embodied, it will be understood that the construction and arrangement of parts may be varied without departing from the spirit and scope of my invention. I do not therefore wish to be understood as limiting myself to the specific construction illustrated, herein, other than as limited in the appended claims.

I claim:

1. A temporary load support for a semi-trailer, including a pair of transversely spaced supporting legs carried by the trailer frame and movable to and from operative position, ground-engaging elements carried at the lower ends of said legs, and separate spring means associated with each of said legs and arranged to yield independently of each other, whereby to provide a compensating action so that each of said spring means carries a portion of the trailer load when the legs are in operative position and the trailer is uncoupled from the tractor.

2. A temporary load support for a semi-trailer, including a pair of transversely spaced supporting legs each comprising a pair of co-operating telescopic tubular members, ground-engaging elements carried at the lower ends of the lowermost members, means for resiliently transmitting the load on the trailer to the ground-engaging elements when the trailer is uncoupled from the tractor, said means including a plurality of coil springs disposed exteriorly about the co-operating tubular leg members and reacting between opposing abutments on the respective co-operating members; and a housing rigidly associated with one of said leg members and arranged for snugly encasing said coil springs throughout the entire length and throughout the entire range of telescoping, for preventing the individual coil springs bowing outward under the stress of compression.

3. A temporary load support for a semi-trailer, including a pair of transversely spaced supporting legs each comprising a pair of co-operating telescopic tubular elements, yielding means associated with the respective leg members for normally opposing telescopic movement thereof, the lower end of each of the lower leg members being provided with a journal bearing, a transversely extending shaft journaled in said bearings, and ground-engaging elements carried at the outer ends of said shaft, said bearings being formed to provide a pivoting action for said shaft, for permitting vertical adjustment of one of said ground-engaging elements relative to the other, under control of said yielding means for accommodating roadbed irregularities when the trailer is uncoupled from the tractor.

4. In the construction defined in claim 3, said journal bearing at the lower end of the leg member being internally larger at its opposite ends than at its center so as to provide for and accommodate the movement of the shaft therein in adjustment of the ground-engaging elements to the road-bed irregularities.

5. A construction for the purpose indicated comprising in combination with a vehicle body, a frame structure consisting of a pair of leg members each comprising a downwardly extending tubular part, and means independent of the hereinafter mentioned transverse connecting element for rendering said leg members rigidly parallel as to said tubular parts; a second pair of leg members arranged at their upper ends for telescoping in the tubular terminal parts of the first mentioned leg members respectively, and constituting therewith a pair of legs for supporting the vehicle body, each of said legs being furnished with independent means for limiting their extension by the telescoping of their leg members, and separate and independently operating means for effecting such extension, and a transversely extending member connecting the second mentioned pair of leg members at their lower ends, with freedom for angular movement of said connecting member relatively to the leg members, and ground supports carried by said transverse member at its opposite ends; whereby vertical change of position of the ground supports with respect to the vehicle may occur independently of each other.

6. A construction for the purpose indicated comprising in combination with a vehicle body, a frame structure consisting of a pair of leg members each comprising a downwardly extending tubular part, and means independent of the hereinafter mentioned axle rendering said leg members rigidly parallel as to said tubular parts; a second pair of leg members arranged at their upper ends for telescoping in the tubular terminal parts of the first mentioned leg members respectively, and constituting therewith a pair of legs for supporting the vehicle body, said legs being furnished with independent means for limiting their extension by the telescoping of their leg members, and separate and independently operating spring means reacting between the telescoping members of each leg for extending the leg normally to the limit determined by said limiting means, and an axle connecting the second mentioned pair of leg members at their lower ends, with freedom for angular movement of said axle relatively to the leg members, and ground supports carried by said axle, whereby the two legs are adapted for independently resiliently transmitting the load of the vehicle to the ground supports and yielding upwardly independently of each other.

In testimony whereof, I have hereunto set my hand at Edgerton, Wis., this 25th day of February, 1931.

LEROY E. WILLIAMS.